US008566274B2

(12) United States Patent
Koister (10) Patent No.: US 8,566,274 B2
(45) Date of Patent: Oct. 22, 2013

(54) METHODS AND SYSTEMS FOR IMPLEMENTING A COMPOSITIONAL RECOMMENDER FRAMEWORK

(75) Inventor: Jari Koister, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 268 days.

(21) Appl. No.: 12/987,957

(22) Filed: Jan. 10, 2011

(65) Prior Publication Data

US 2011/0282814 A1 Nov. 17, 2011

Related U.S. Application Data

(60) Provisional application No. 61/334,123, filed on May 12, 2010.

(51) Int. Cl.
*G06F 15/18* (2006.01)

(52) U.S. Cl.
USPC ............................................... 706/62

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |

(Continued)

*Primary Examiner* — Kakali Chaki
*Assistant Examiner* — Mario Riojas Ramirez
(74) *Attorney, Agent, or Firm* — Ingrassia Fisher & Lorenz, P.C.

(57) ABSTRACT

A compositional recommender framework using modular recommendation functions is described. Each modular recommendation function can use a discrete technology, such as using clustering, a database lookup, or other means. A first recommendation function can recommend to a user items, such as books to check out, automobiles to purchase, people to date, etc. Another modular recommendation function can be daisy chained with the first to recommend items that are similar or related to the first recommended items, such as users who have also checked out the same recommended book, trailers that can be towed by the recommended automobiles, or vacations booked by people that were recommended as people to date. The modular recommendation functions can be used to build customized recommendation engines for different industries.

18 Claims, 9 Drawing Sheets

(56) References Cited

U.S. PATENT DOCUMENTS

| | | |
|---|---|---|
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0041548 A1* | 2/2006 | Parsons et al. .................... 707/5 |
| 2009/0063439 A1* | 3/2009 | Rauser et al. .................... 707/4 |
| 2010/0268661 A1* | 10/2010 | Levy et al. .................... 705/347 |

* cited by examiner

RECOMMENDATION BY CLUSTERING

METHODS AND SYSTEMS FOR IMPLEMENTING A COMPOSITIONAL RECOMMENDER FRAMEWORK

CROSS-REFERENCES TO RELATED APPLICATIONS

This application claims the benefit of U.S. Provisional Application No. 61/334,123, filed May 12, 2010, which is hereby incorporated by reference in its entirety for all purposes.

This application is related to U.S. application Ser. No. 12/987,932, filed Jan. 10, 2011 and titled "Methods and Systems For Performing Real-Time Recommendation Processing", which is hereby incorporated by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Art

The present invention generally relates to making recommendations in an online search, and more particularly to a compositional recommender framework for use in creating recommendations in an on-demand database and/or application service.

2. Discussion of the Related Art

Cloud computing has become popular in the last few years. Cloud computing involves applications executing on general purpose servers out on a network. If one of the servers goes down, the an application executing on it is shifted to another server. More or fewer servers are employed depending on the processing power, memory, and bandwidth required for the application. The processing capacity of the servers is fungible between applications, and as such is treated as a commodity by some companies.

Because the processing power provided by the servers is oftentimes readily accessible over a high-speed network, some enterprising companies have outsourced their processing needs to other firms, including those that specialize in providing such processing power through their high-end servers.

Taking the cloud computing model further, some providers of server processing power have developed their own software applications to run on their own servers. The companies offer access to these web/cloud applications to other businesses on a pay-as-you-need or other contractual basis. These applications have traditionally been for common business functions, such as those provided by database applications to track sales leads and other opportunities for sales teams.

Although most cloud-based, provider-developed applications are accessed internally by employees of a company, other applications can be accessed directly by the company's retail customers. Those that are accessible by a company's customers are, understandably, tightly controlled by the company because the end-user experience is so important. A customer who is frustrated with a company's web interface may give up before making a purchase and go elsewhere. It is important for customers to have a good experience on a company's web site and be able to find what they want to purchase without difficulty. Offering recommendations to a user can enhance the user's shopping experience and also serve up opportunities for more sales from the company.

Many web/cloud applications provide recommendations to a user. The recommendations often are very specific to the applications and tightly coupled with the application itself. For example, an online bookseller's web site can recommend items for sale that may potentially interest a user. As another example, an online video rental web site can recommend movies that seem to fit users' preferences based on their previous rentals. These recommender systems are considered proprietary, and their inner workings are not exposed to the outside world.

Building proprietary recommender systems can be expensive, especially recommender systems that use clustering technologies. Of all recommender systems, those based on clustering sometimes deliver the most clever and unobvious recommendations, but with a price. Clustering algorithms are often complex and slow. They oftentimes require tuning by specialist consultants so that they work properly and give adequate, professional results. In contrast to clustering technologies, database lookup technologies are relatively fast, but they take time to establish and often require their own experts.

A better way of recommending questions to ask and obtaining information in general is needed.

BRIEF SUMMARY

Generally, methods and systems for building recommendation engines for web sites, kiosks, etc. are presented. Modular recommendation functions are coded to output recommendations based on discrete technologies. Multiple modular recommendation functions can be daisy chained together so that the output of one recommendation function, such as one based on clustering, connects to the input of another recommendation function, such as one based on database lookups. The output of the combination is output as a list of recommendations. Still more recommendation functions can be added to expand the number of recommended items and build more complex recommendation engines, depending upon the needs of the business that employs its use. The output of the combined chain of functions are what can be presented to an end user.

The recommendation functions are modular, so they can be combined in many different ways as long as the outputs from some of the functions are compatible to be input into some of the other functions. A company can relatively easily customize a recommendation engine within the framework without having to delve into low-level computer code.

Some embodiments relate to a method of building a recommendation engine using a compositional recommender framework. The method includes selecting a first modular recommendation function, the first recommendation function configured to accept a user object and output, based on clustering, at least one recommended document object based on the user object, selecting a second modular recommendation function, the second recommendation function configured to accept a document object and output, based on a database lookup, at least one user object based on the accepted document object, wherein an output object from either modular function is compatible as an input object to the other modular function, and configuring the modular functions so that the at least one recommended document object from the first modular recommendation function is an input object to the second modular recommendation function, the configuring to build a recommendation engine such that a recommendation from the recommendation engine is based on an input to the first modular function.

Some embodiments relate to a method of building a recommendation engine using a compositional recommender framework. The method includes selecting a first modular recommendation function, the first recommendation function configured to accept a first input object and output at least one first recommended object based on the first input object, selecting a second modular recommendation function, the second recommendation function configured to accept a second input object and output at least one second recommended object based on the second input object, wherein an output object from either modular function is compatible as an input object to another modular recommendation function, and configuring, using a processor operatively coupled with a memory, the modular functions so that one of the at least one first recommended objects from the first modular recommendation function is an input object to the second modular recommendation function, the configuring to build a recommendation engine such that a recommendation from the recommendation engine is based on an output from the second modular function, which is based on an output from the first modular function.

The method can further include reconfiguring the modular function so that one of the at least one second recommended objects from the second modular recommendation function is an input object to the second modular recommendation function, the reconfiguring to build a reconfigured recommendation engine such that a recommendation from the reconfigured recommendation engine is based on an output from the first modular function, which is based on an output from the second modular function.

In another embodiment, the method can further include selecting a third modular recommendation function, the third modular recommendation function configured to accept a third input object and output at least one third recommended object based on the third input object, wherein an output object from the third modular recommendation function is compatible as an input object to another modular recommendation function, and reconfiguring the modular functions so that one of the at least one second recommended objects from the second modular recommendation function is an input object to the third modular recommendation function.

Some embodiments relate to a method of using a recommendation engine built using a compositional recommender framework. The method includes selecting an object of interest, inputting the object into a first modular recommendation function, the first recommendation function configured to accept a first input object and output at least one first recommended object based on the first input object, inputting, automatically without user interaction, using a processor operatively coupled with a memory, the at least one first recommended object into a second modular recommendation function, the second recommendation function configured to accept a second input object and output at least one second recommended object based on the second input object, and receiving data representing at least one output object from the second recommendation function as a recommendation, the recommendation based upon the object of interest.

Embodiments also include machine readable tangible storage mediums carrying instructions and computer systems, including an on-demand database service, executing instructions to perform the above methods.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

The present application relates to methods and systems for implementing a compositional recommender framework for building recommendation engines, such as those used to recommend items that might be of interest to a consumer browsing online. Modular recommendation functions are coded so that they can be moved, swapped around, and otherwise reconfigured with each other.

Modular recommendation functions can be daisy chained or otherwise assembled together so that the output of one recommendation function proceeds automatically to the input of another recommendation function. The modular functions can be swapped out for other functions so that different recommendation strategies can be implemented. Additional modular functions can be assembled to the chain so that the output of the original recommendation functions goes to the input of the additional modular function. The output of the last modular recommendation function is the output that is sent to a user.

In one embodiment, one of the modular functions recommends output objects based on clustering. Clustering is the assignment of elements of a set into subsets. Clustering is used in statistical data analyses and can yield patterns that are difficult to observe when analysis narrowly focus on just one or two attributes of elements in the set.

A modular function based on clustering can be combined with another modular function based on database lookups. Database lookups can use a predefined database schema and built-in relational database management system search functions to return items of interest. Looking up items that are similarly classified in a database can be a fast, straightforward way to recommend items.

Multiple recommendations from the clustering are further analyzed to give multiple recommendations based on database methods. Still further, additional modular functions can further expand the recommendations One example of a recommendation engine is a recommender that recommends to a sales person other people that can help close an opportunity. First, a recommendation is based on the opportunity at hand, and other opportunities that are similar based on a generated cluster are found. This results in a set of opportunities. From these opportunities, people who worked on them are found using "related-to" techniques. This results in a set of users that will be ranked according to relevancy and then recommended. There are other examples.

A car dealer who is using the on-demand database for its customer web portal may wish to recommend cars to customers who are visiting the portal. The car dealer may assemble a recommendation engine by chaining multiple recommendation functions together. One recommendation function may take an object representing the customer and determine 'like customers.' For example, if it is known that the customer is geographically located in the State of Virginia, is married, and is willing to spend $30,000 on a car, then other married consumers who have recently bought cars in Virginia for under $30,000 may be looked up to determine what cars they bought. The list of cars that the related consumers bought may be input into a second recommendation function. The second recommendation function may use clustering techniques to determine cars that are similar to other cars. Based on clustering, car makes/models that are similar to cars recently bought by married customers in Virginia for under $30,000 may be output. Further, these similar cars may be input into a third recommendation function. The third recommendation function may perform a lookup within a database to determine cars that are related in style and features as the similar cars. These cars, that are related in style and features to cars that are similar to those bought recently by married customers in Virginia for under $30,000 may be presented to the online customer as recommended cars for him or her to consider.

Recommendation engines built with modular recommendation functions may be especially useful in cloud computing and on-demand database services. Such services can centralize the operation and maintenance of powerful computers while offering self-hosted software that is available for multiple companies to use. The companies can offer services to consumers directly through the on-demand database service. Custom recommendation engines, tailored for a particular industry, can be used to enhance the consumers' experiences.

System Overview

Figure 1:
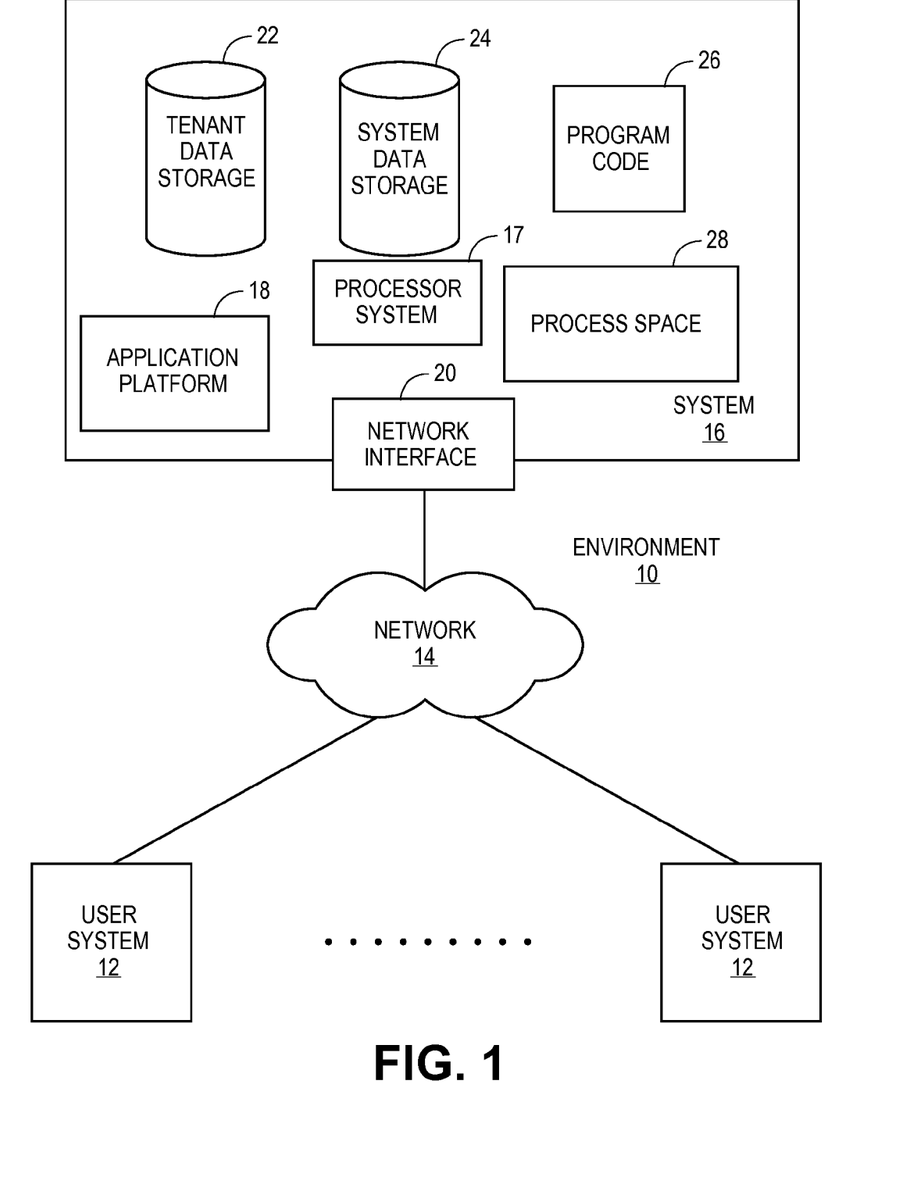
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
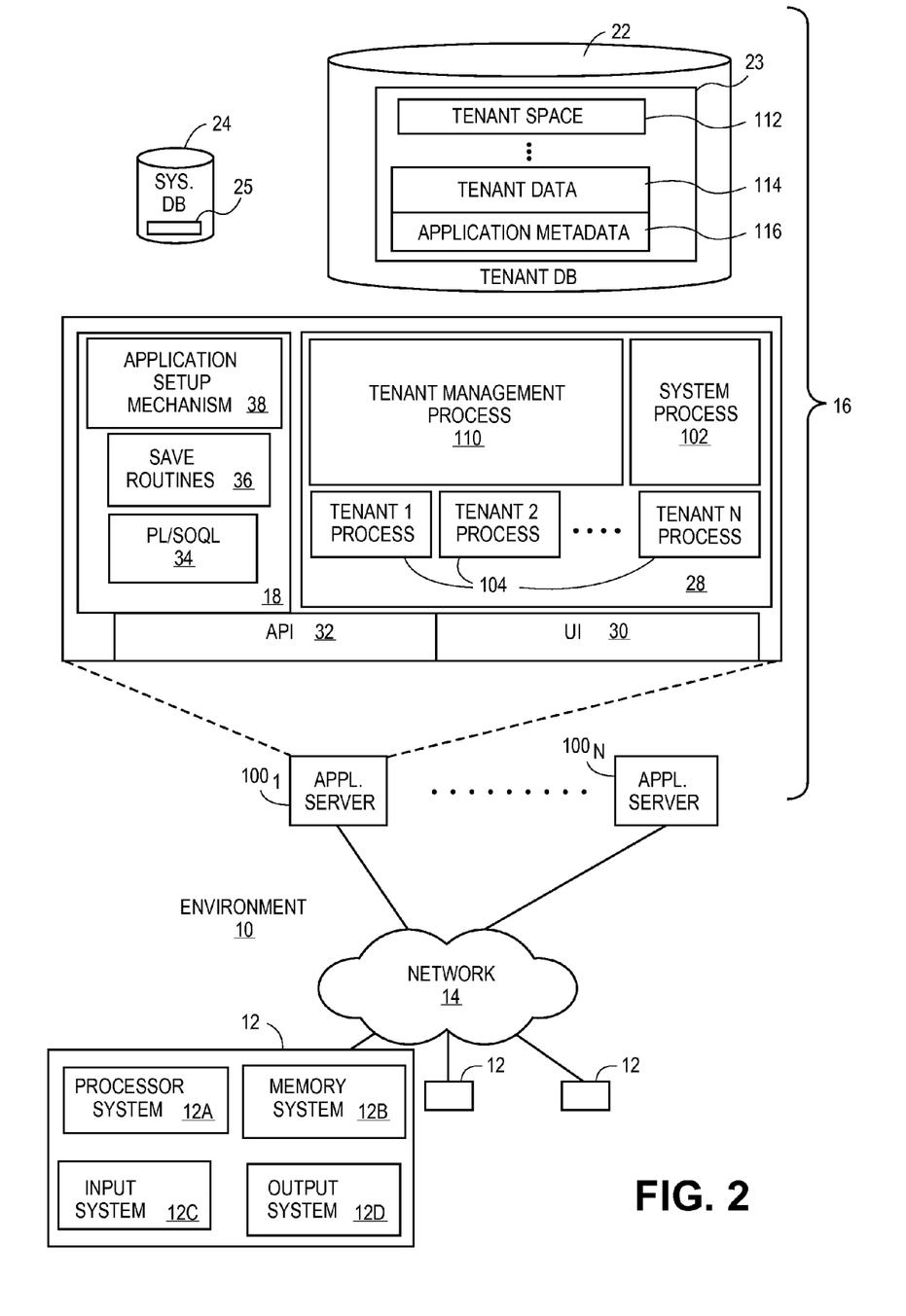
FIG. 2 illustrates a block diagram of an embodiment of elements of FIG. 1 and various possible interconnections between these elements according to an embodiment of the present invention.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Provisional Patent Application 60/828,192 entitled "Programming Language Method and System for Extending APIs to Execute In Conjunction With an On-Demand Database Service," by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. Yet another table or object might describe an Opportunity, including fields such as organization, period, forecast type, user, territory, etc.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System," and which is hereby incorporated herein by reference, teaches systems and methods for creating custom objects as well as customizing standard objects in a multi-tenant database system.

Compositional Recommender Framework

A "recommendation function" is a function that has the ability to output similar, related, or otherwise associated objects to those that are input. Often a recommendation is created using a combination of similar and related relationships. For the purpose of example, the terms "similar" and "related" are sometimes defined as follows:

"similar" objects are such that have been clustered together using a specified feature vector and a specific clustering algorithm. Similar objects reside in the same cluster at some level in a cluster hierarchy. Objects are only clustered with other objects of the same type or objects with a common super type.

"related" objects have been semantically related in some way. Related is often used for objects of a different type. For example, an author is related to wiki pages that she has authored. Two discussions in the same group can be considered related through their group membership.

Related relationships can be annotated and also ranked by strength and importance.

Although similar and related in this context may have much in common, there can be fundamental differences on the implementation level. Similarity is applied on sets of objects where all objects in the set are of the same type, while related to can be applied to sets containing objects of different types, and may result in sets of objects of different types. Furthermore, similarity is calculated by the system based on some attributes (features) of the involved objects and a similarity function. Related, on the other hand, can be based on an explicit relationship between the objects. On a concrete implementation level, it is sometimes desirable to represent similarity relationships in clusters, while related relationships are derived from explicit relations in the application database.

Figure 3:
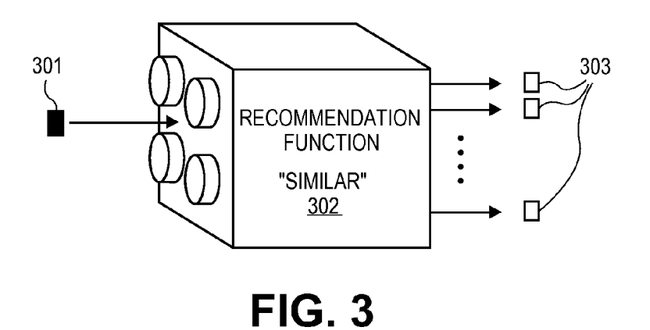
FIG. 3 illustrates a modular recommendation function in accordance with an embodiment.

FIG. 3 illustrates a modular recommendation function in accordance with an embodiment. Input object 301, which represents a document, can be input into modular recommendation function 302. Modular recommendation function 302 uses the input to output objects 303, which represent other, similar documents. It may be said that modular recommendation function 302 is configured to accept a document object as an input and output one or more recommended document objects. Objects 303 are documents that are similar to document 301.

Figure 4:
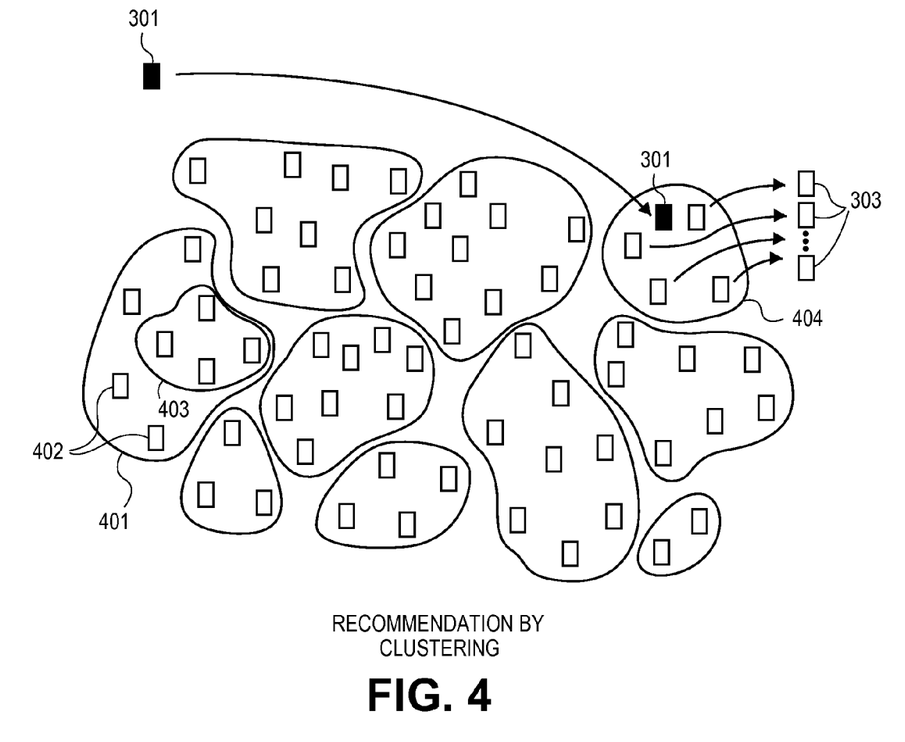
FIG. 4 illustrates clustering in accordance with an embodiment.

FIG. 4 illustrates clustering in accordance with an embodiment. Clustering can be used to find similar documents. In the embodiment, similar documents 402 are clustered together in cluster 401. Further, superclustering and subclustering can also be implemented for a hierarchy of clusters. Cluster 403 is a subcluster of cluster 401.

Clustering, which oftentimes takes a great amount of processor power and time, can be performed at times when processor power is readily available, such as at night or on weekends. Clustering algorithms can be tuned for specific types of objects, such as documents, user objects, or custom objects, such as a "car" object that represents cars at a car dealership.

In the figure, document object 301 is clustered with four other documents in cluster 404. These four other documents are output as output document objects 303 from the cluster. These output document objects 303 are the recommended documents from the recommendation function.

Figure 5:
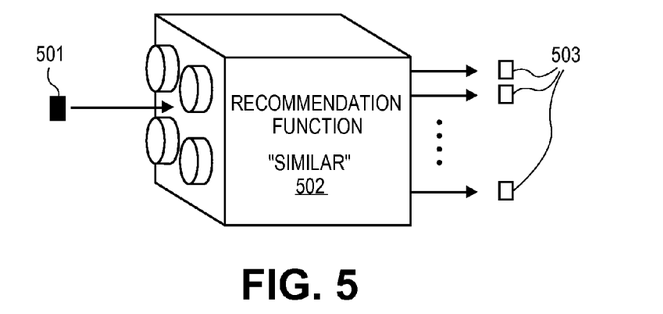
FIG. 5 illustrates a modular recommendation function in accordance with an embodiment.

FIG. 5 illustrates a modular recommendation function in accordance with an embodiment. Input object 501, which represents a document, can be input into modular recommendation function 502. Modular recommendation function 502 uses the input to determine related output objects 503, which represent other documents. It may be said that modular recommendation function 502 is configured to accept a document object as an input and output one or more recommended document objects. Objects 503 are documents that are related to document 501.

Figure 6:
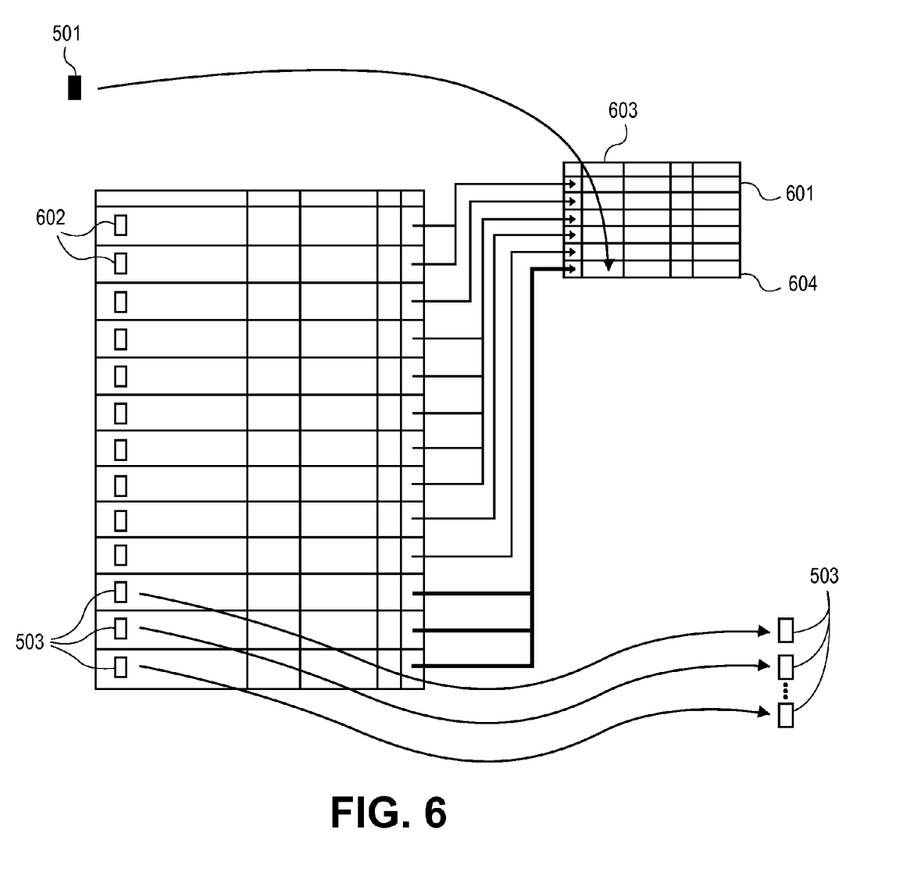
FIG. 6 illustrates a database lookup in accordance with an embodiment.

FIG. 6 illustrates a database lookup in accordance with an embodiment. Database lookups can be used to find related documents, related users, or other objects of different types from the input object. In the exemplary embodiment, related documents 602 are keyed to the same row 601 in category table 603. Table 603 can be a list of categories, such as genres, a list of authors, a list of vehicle manufacturers, etc.

Database tables and their associated schema can be predefined. Items such as books and cars can be readily categorized in many different ways and associated with each other and other types of objects. For example, a book can be associated with users who previously bought the same book.

In the figure, document object 501 shares the same category, determined by a metadata tag, as documents 503. The category, defined in row 604 of category table 603, is looked up by a simple query, and the documents that point to this entry are identified. These three documents are output as output documents 503 from the database table.

Figure 7:
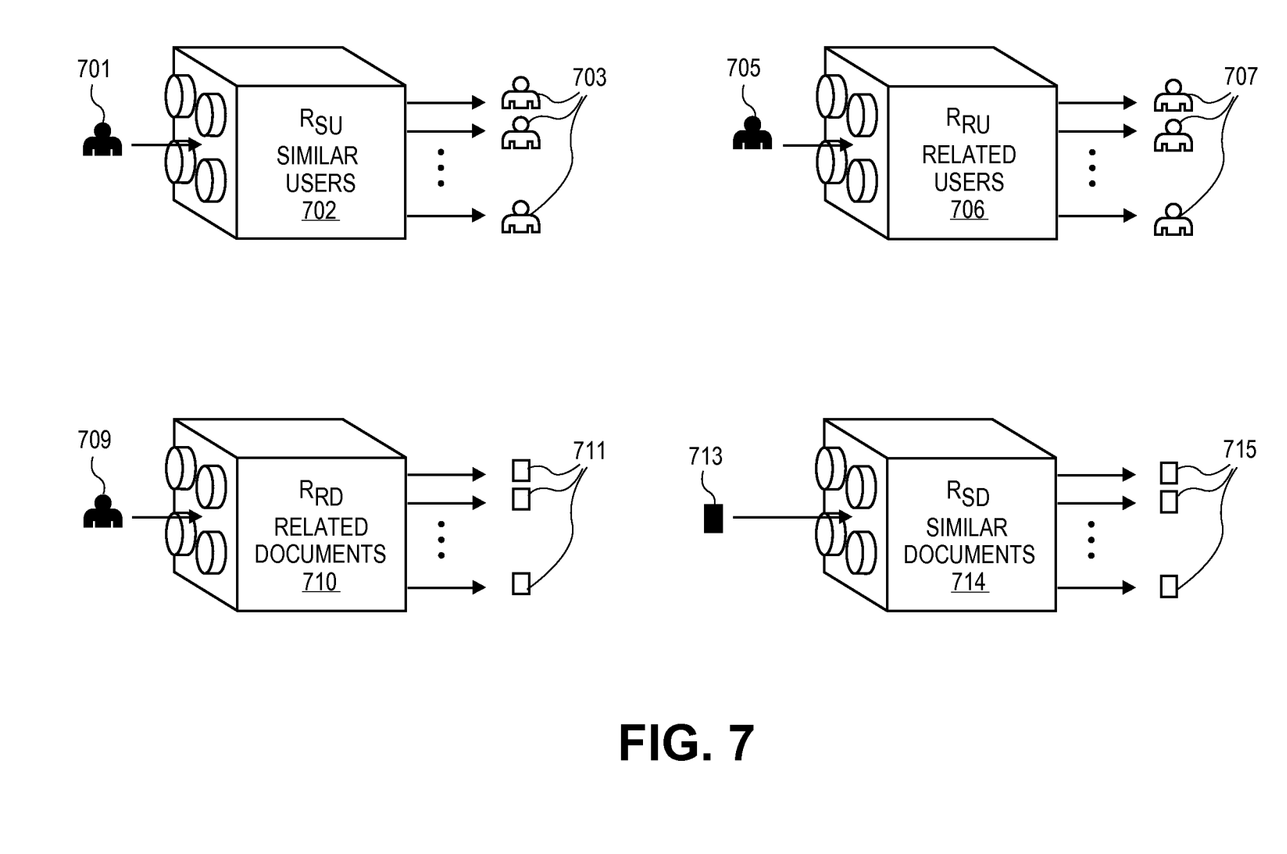
FIG. 7 illustrates multiple modular recommendation functions in accordance with an embodiment.

FIG. 7 illustrates multiple modular recommendation functions in accordance with an embodiment.

Input object 701 represents a user. Attributes of a user object can include a user's name, address, geographic location, Internet Protocol (IP) address, age, marital status, and any other characteristics of the user. Recommendation function 702, designated $R_{SU}$ (similar users), accepts user object 701 as input and outputs zero or more similar user objects 703. $R_{SU}$ can use clustering to find similar users to user 701.

Input object 705 also represents a user. Recommendation function 706, designated $R_{RU}$ (related users), accepts user object 705 as input and outputs zero or more related user objects 707. $R_{RU}$ can use database lookups to find similar users to user 705.

Input object 709 also represents a user. Recommendation function 710, designated $R_{RD}$ (related documents), accepts user object 709 as input and outputs zero or more related document objects 711. $R_{RD}$ can use database lookups to find documents that are related to user 709. For example, $R_{RD}$ can output all documents that were authored by user 709.

Input object 713 represents a document. Recommendation function 714, also designated $R_{SD}$ (similar documents), accepts document object 713 as input and outputs zero or more related document objects 715. $R_{SD}$ can use clustering to find documents that are similar to document 713.

The outputs from some of the recommendation functions are compatible as inputs to other recommendation functions. For example, each output user object from recommendation function 706 can be input into recommendation function 702. For these particular recommendation functions, the orders can be reversed as well. That is, each output user object from recommendation function 702 can be input into recommendation function 706.

Because many recommendation functions output multiple objects while accepting only one, single input object at a time, an interface may be desired to map multiple objects into a single input so that they flow one at a time.

Figure 8:
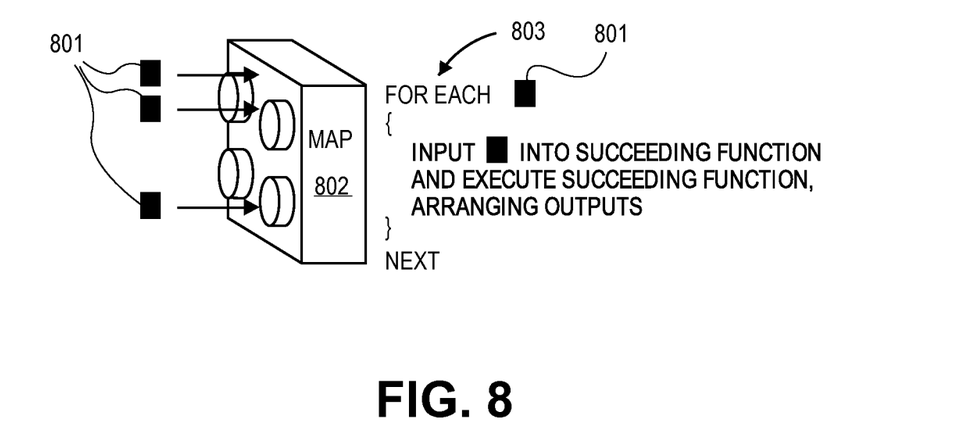
FIG. 8 illustrates a mapping function in accordance with an embodiment.

FIG. 8 illustrates a mapping function in accordance with an embodiment. Multiple input objects 801 are accepted as inputs by mapping function 802. Mapping function 802 controls the following function and aggregates outputs from the following function as shown in pseudo-code 803. Mapping function 802 serializes the inputs so that only one input object 801 proceeds to the succeeding function at a time. The outputs from each execution of the succeeding function are corralled into one, common set of outputs.

A mapping function can be used to join recommendation functions together. Mapping functions can be separate components from recommendation functions, as the embodiment shown here, or they can be integral to recommendation functions.

Figure 9:
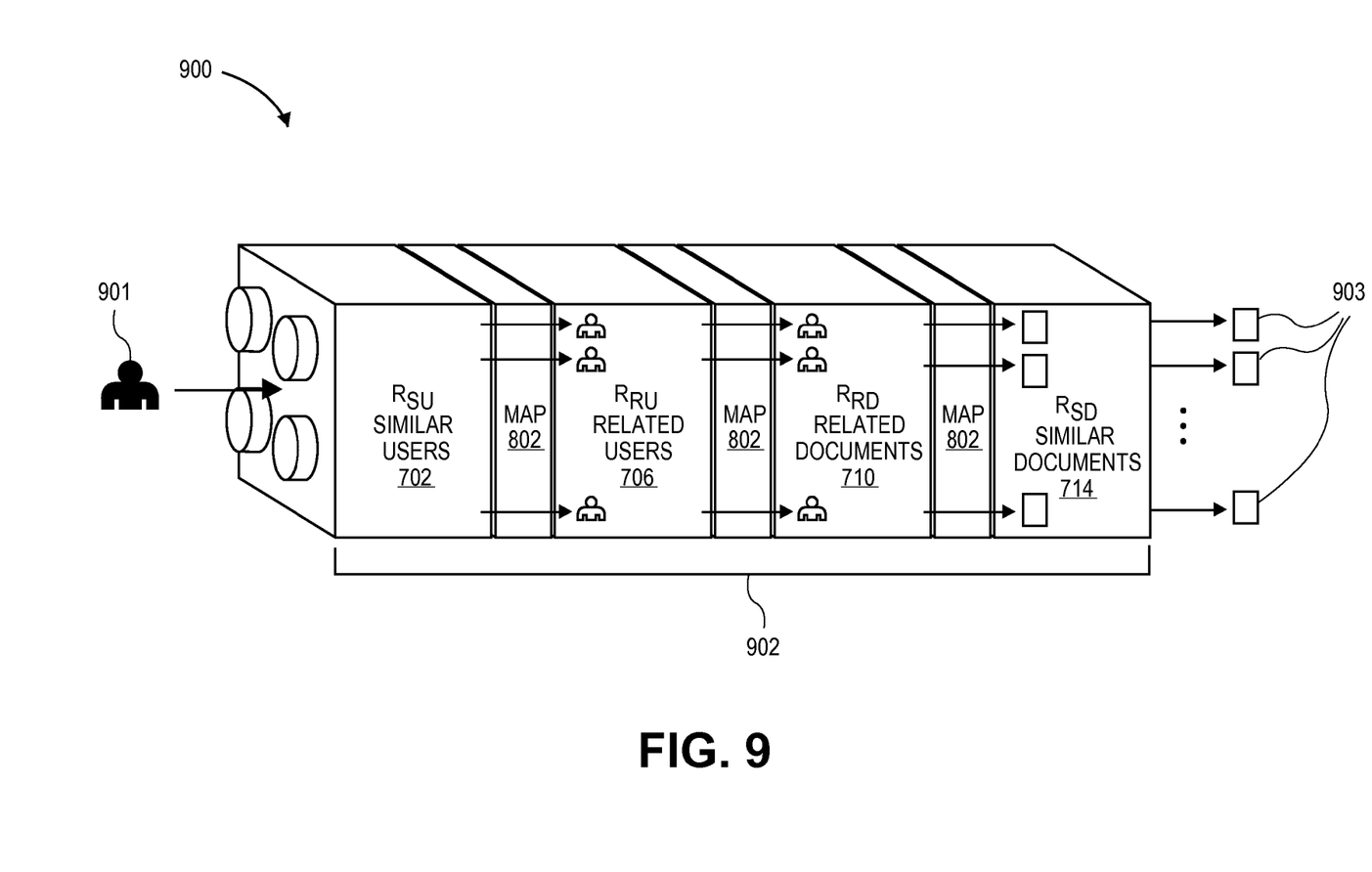
FIG. 9 illustrates a recommendation engine built from modular recommendation functions in accordance with an embodiment.

FIG. 9 illustrates a recommendation engine built from modular recommendation functions in accordance with an embodiment. Recommendation engine 900 is assembly 902 of recommendation functions and mapping functions. The modular functions are configured by a developer so that recommended objects from one modular recommendation function are input objects to other modular recommendation functions.

In the figure, modular recommendation function 702 outputs to mapping function 802, which then maps the output of recommendation function 702 to recommendation function 706. The outputs from recommendation function 706 are output to another mapping function 802, which then maps the output of recommendation function 706 to recommendation function 710. The outputs from recommendation function 710 are output to yet another mapping function 802, which then maps the output of recommendation function 710 to recommendation function 714.

User object 901 is input into the recommendation engine. Recommendation function 702 finds similar users to user 901 and outputs a list of similar users. The list is expanded by recommendation function 706, which finds related users to the similar users output by recommendation function 702. For example, similar users output by 702 could include clustered users of the same relative interests and income levels to that of input user 901. Related users output by 706 could include users, looked up in a database, of the same age and gender to the similar users.

The related users are input into recommendation function 710 to find documents that are somehow related to the users of the same age and gender to the similar users. Those documents are automatically fed into recommendation function 714 to find similar documents to the related documents. For example, documents that are related to the related users may include books that were recently checked out from the library by those users. Similar documents to those books may be those books of the same genre, prose, and authorship.

The modular recommendation functions can be placed in different orders to make a new recommendation engine. New recommendation functions can be created as well by developers. For example, a recommendation function that inputs a user and finds recommended cars (i.e., output objects representing cars) could be custom built by a developer and uploaded into the compositional framework. A car dealership may build its own recommendation engine, using functions for similar consumers, related cars, etc., to propose cars that an online consumer may wish to investigate. The recommendation engines can be tailored for the point in the consumer's process of finding a suitable automobile. For example, a user who is far along in determining what car would work for him or her may wish to narrow the recommendations so that those bought by similar people to him- or herself are not shown. Thus, a "similar users" recommendation function could be omitted from this recommendation engine.

Different industries can build and deploy different recommendation engines using the building-block framework described herein. A bookseller may wish for one set of modular recommendation functions, while a clothing retailer may wish for another set. Likewise, the order of recommendation functions may be important in some industries. For example, it may be best to find similar users first and then find related documents in one industry, while it may be best to find related documents first and then similar documents in another industry. The right permutation of recommendation functions can be custom built by individual clients depending on their specific needs and expertise in the domain.

Figure 10:
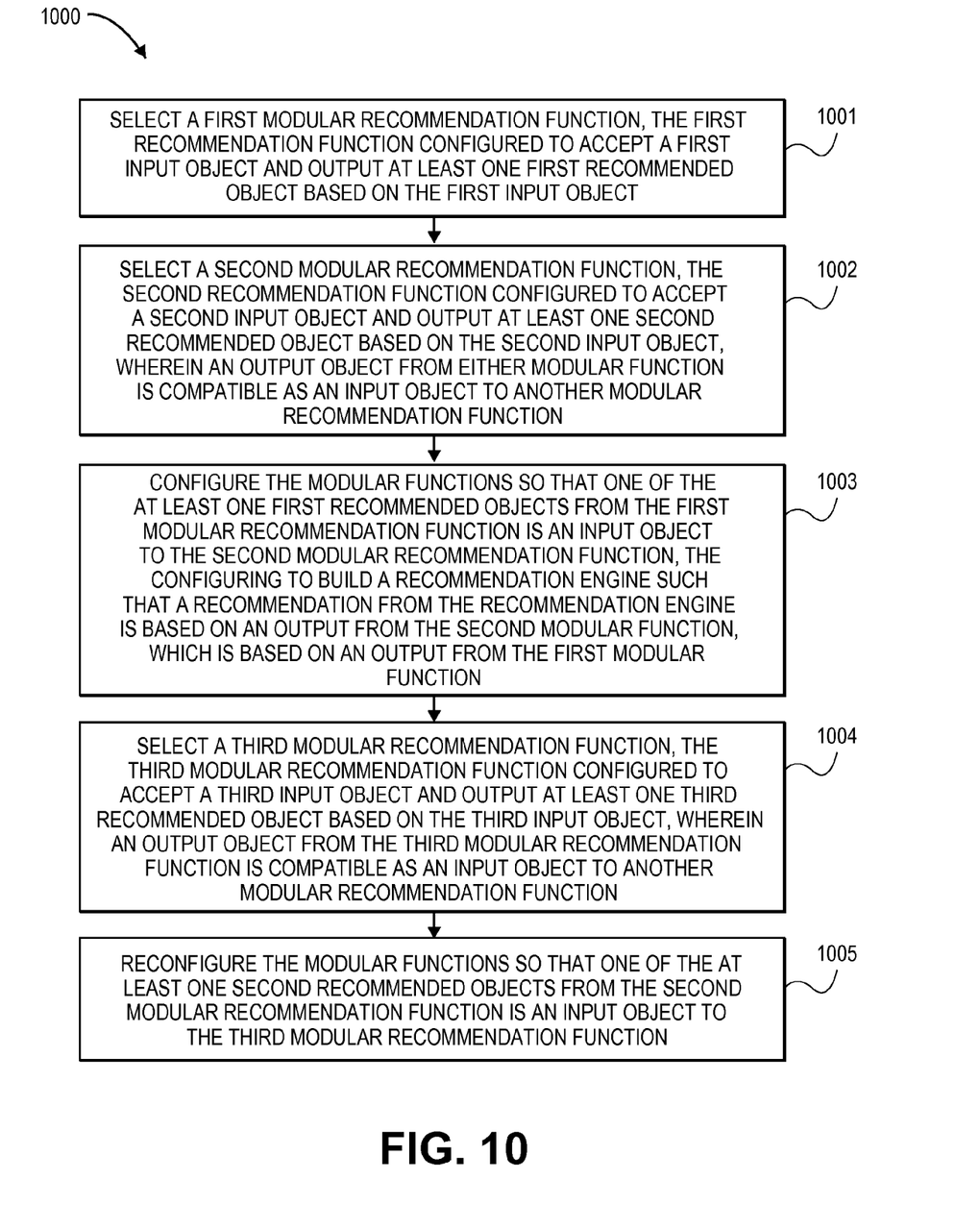
FIG. 10 is a process diagram in accordance with an embodiment.

FIG. 10 is a process diagram in accordance with an embodiment. Process 1000 can be automated in a computer or other machine and can be coded in software, firmware, etc. In operation 1001, a first modular recommendation function is selected, the first recommendation function configured to accept a first input object and output at least one first recommended object based on the first input object. In operation 1002, a second modular recommendation function is selected, the second recommendation function configured to accept a second input object and output at least one second recommended object based on the second input object, wherein an output object from either modular function is compatible as an input object to another modular recommendation function. In operation 1003, the modular functions are configured so that one of the at least one first recommended objects from the first modular recommendation function is an input object to the second modular recommendation function, the configuring to build a recommendation engine such that a recommendation from the recommendation engine is based on an output from the second modular function, which is based on an output from the first modular function. In operation 1004, a third modular recommendation function is selected, the third modular recommendation function configured to accept a third input object and output at least one third recommended object based on the third input object, wherein an output object from the third modular recommendation function is compatible as an input object to another modular recommendation function. In operation 1005, the modular functions are reconfigured so that one of the at least one second recommended objects from the second modular recommendation function is an input object to the third modular recommendation function.

Figure 11:
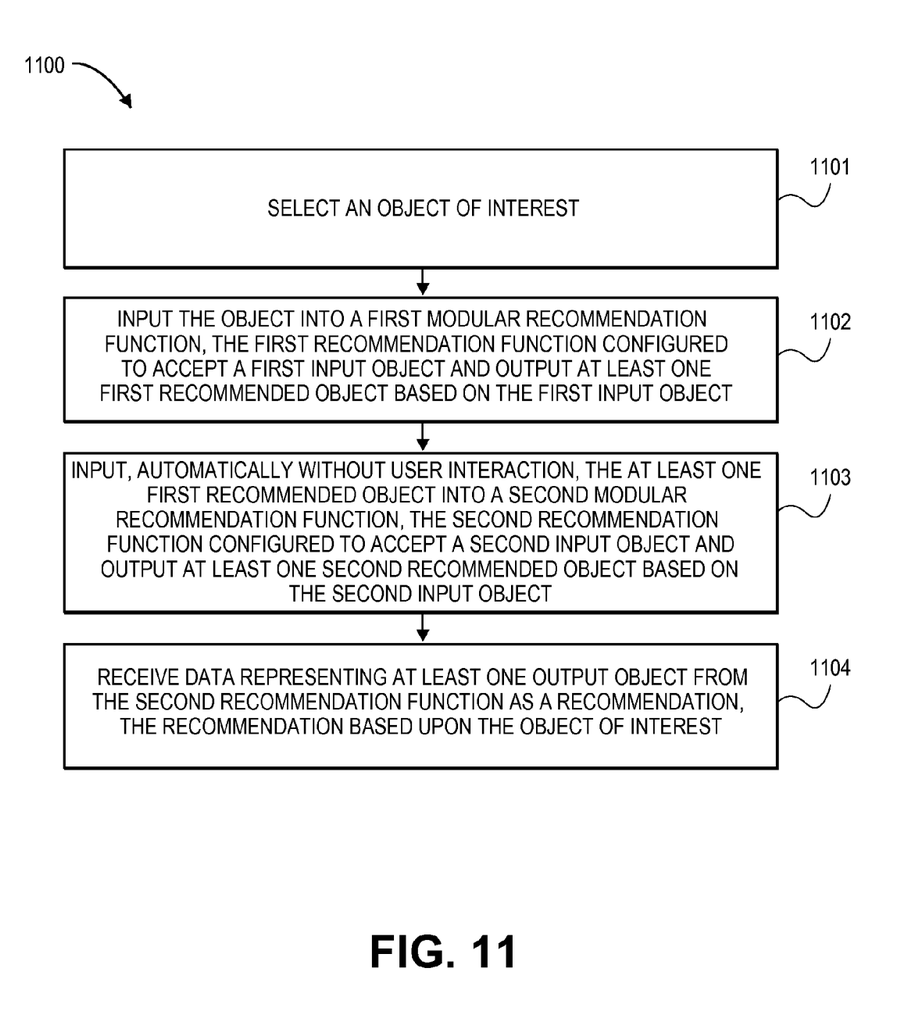
FIG. 11 is a process diagram in accordance with an embodiment.

FIG. 11 is a process diagram in accordance with an embodiment. Process 1100 can be automated in a computer or other machine and can be coded in software, firmware, etc. In operation 1101, an object of interest is selected. In operation 1102, the object of interest is input into a first recommendation function, the first recommendation function configured to accept a first input object and output at least one first recommended object based on the first input object. In operation 1103, the at least one first recommended objection is input, automatically without user interaction, into a second modular recommendation function, the second recommendation function configured to accept a second input object and output at least one second recommended object based on the second input object. In operation 1104, data representing at least one output object is received from the second recommendation function as a recommendation, the recommendation based upon the object of interest.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of building a recommendation engine using a compositional recommender framework, the method comprising:
   selecting a first modular recommendation function, the first recommendation function configured to accept a first input object and output at least one first recommended object based on the first input object;
   selecting a second modular recommendation function, the second recommendation function configured to accept a second input object and output at least one second recommended object based on the second input object, wherein an output object from either modular function is compatible as an input object to another recommendation function;
   configuring, using a processor operatively coupled with a memory, the modular functions so that one of the at least one first recommended objects from the first modular recommendation function is an input object to the second modular recommendation function, the configuring to build a recommendation engine such that a recommendation from the recommendation engine is based on an output from the second modular function, which is based on an output from the first modular function; and
   reconfiguring the first and second modular recommendation functions so that one of the at least one second recommended objects from the second modular recommendation function is an input object to the first modular recommendation function, the reconfiguring to build a reconfigured recommendation engine such that a recommendation from the reconfigured recommendation engine is based on an output from the first modular function, which is based on an output from the second modular function.

2. The method of claim 1 wherein the first input object represents a document.

3. The method of claim 2 wherein the at least one first recommended object represents at least one document.

4. The method of claim 2 wherein the at least one first recommended object represents at least one user.

5. The method of claim 1 wherein the first input object represents a user.

6. The method of claim 5 wherein the at least one first recommended object represents at least one document.

7. The method of claim 5 wherein the at least one first recommended object represents at least one user.

8. The method of claim 1 further comprising:
   mapping multiple first recommended objects from the first modular recommendation function to input one at a time as second input objects into the second modular recommendation function.

9. The method of claim 1 wherein the first recommendation function includes a clustering function, the method further comprising:
   clustering the first input object to determine similar objects and outputting at least one of the similar objects as the at least one first recommended object.

10. The method of claim 1 wherein the first recommendation function includes a database lookup function, the method further comprising:
    looking up objects in a database based on the first input object to determine related objects and outputting at least one of the related objects as the at least one first recommended object.

11. The method of claim 1 further comprising:
    inputting an object into the recommendation engine; and
    executing the recommendation engine to generate recommended objects.

12. The method of claim 1 wherein a recommended object from either modular recommendation function is compatible as an input to the other modular recommendation function.

13. The method of claim 1 further comprising:
    selecting a third modular recommendation function, the third modular recommendation function configured to accept a third input object and output at least one third recommended object based on the third input object, wherein an output object from the third modular recommendation function is compatible as an input object to another modular recommendation function; and
    reconfiguring the modular functions so that one of the at least one second recommended objects from the second modular recommendation function is an input object to the third modular recommendation function.

14. The method of claim 1 wherein the operations are performed in the following order: selecting a first modular recommendation function; selecting a second modular recommendation function; and configuring the modular functions.

15. The method of claim 1 wherein each operation is performed by the computer processor operatively coupled to the memory.

16. A computer system executing instructions in a computer program, the computer program instructions comprising program code for performing the operations of claim 1.

17. A machine-readable tangible storage medium embodying a computer program having instructions for causing one or more machines to perform the operations of claim 1.

18. A method of using a recommendation engine built using a compositional recommender framework, the method comprising:

selecting an object of interest;

inputting the object of interest into a first modular recommendation function, the first recommendation function configured to accept a first input object and output first recommended objects based on the first input object;

mapping the first recommended objects from the first modular recommendation function to input one at a time as second input objects into a second modular recommendation function;

inputting, automatically without user interaction, using a processor operatively coupled with a memory, the second input objects into the second modular recommendation function, the second recommendation function configured to accept the second input objects and output at least one second recommended object based on the second input objects;

receiving data representing at least one output object from the second recommendation function as a recommendation, the recommendation based upon the object of interest; and reconfiguring the first and second modular recommendation functions so that one of the at least one second recommended objects from the second modular recommendation function is an input object to the first modular recommendation function, the reconfiguring to build a reconfigured recommendation engine such that a recommendation from the reconfigured recommendation engine is based on an output from the first modular function, which is based on an output from the second modular function.

* * * * *